US012639338B1

(12) United States Patent
Brugere et al.

(10) Patent No.: US 12,639,338 B1
(45) Date of Patent: May 26, 2026

(54) SYSTEM AND METHOD FOR FAIRNESS AWARE OPTIMIZATION WITH FEATURES QUANTIZATION

(71) Applicant: JPMorgan Chase Bank, N.A., New York, NY (US)

(72) Inventors: Ivan Brugere, Des Plaines, IL (US); Michael Hosking, Columbus, OH (US); Joseph Zweier, Columbus, OH (US); Freddy Lecue, Mamaroneck, NY (US); Yue Tan, Lewis Center, DE (US); Huiyan Zhao, Plano, TX (US); John Stettler, Columbus, OH (US); Deven R Kapadia, Yorba Linda, CA (US); Lei Carol Liang, Hamburg, NJ (US); Dan Bollum, Westerville, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 19/071,096

(22) Filed: Mar. 5, 2025

(51) Int. Cl.
*G06F 16/28* (2019.01)
*G06N 20/00* (2019.01)

(52) U.S. Cl.
CPC .......... *G06F 16/285* (2019.01); *G06N 20/00* (2019.01)

(58) Field of Classification Search
CPC .............................. G06F 16/285; G06N 20/00
See application file for complete search history.

(56) References Cited

U.S. PATENT DOCUMENTS

| | | | |
|---|---|---|---|
| 11,720,962 B2 * | 8/2023 | Kamkar ................. | G06Q 40/03 |
| | | | 705/38 |
| 12,321,839 B1 * | 6/2025 | Merrill .................... | G06N 20/00 |
| 2021/0224605 A1 * | 7/2021 | Zhang ..................... | G06N 20/00 |
| 2022/0012542 A1 * | 1/2022 | Cruz ...................... | G06N 5/01 |
| 2022/0012591 A1 * | 1/2022 | Dalli ...................... | G06F 18/10 |
| 2024/0135238 A1 * | 4/2024 | Sattigeri .............. | G06N 3/0455 |
| 2024/0193416 A1 * | 6/2024 | Wu ......................... | G06N 5/022 |
| 2024/0193481 A1 * | 6/2024 | Bucklin ................. | G06N 20/00 |
| 2025/0013887 A1 * | 1/2025 | Yao ........................ | G06N 3/047 |
| 2025/0021868 A1 * | 1/2025 | Andrews ................. | G06N 7/01 |
| 2025/0245562 A1 * | 7/2025 | Pushak ................... | G06N 20/00 |

* cited by examiner

*Primary Examiner* — Alicia M Willoughby
(74) *Attorney, Agent, or Firm* — Greenblum & Bernstein, P.L.C.

(57) ABSTRACT

Various methods and processes, apparatuses or systems, and media for performing fairness aware optimization are disclosed. The present disclosure provides acquiring and quantizing a plurality of input features for an application, and binning of each of the plurality of input features quantized so that each of the plurality of input features is assigned to a bin among a plurality of bins to provide a matrix of bin membership for each of the plurality of applications. A vector is then generated based on the matrix of bin membership for evaluating the generated vector against a target value and presence of disparity in outcome for a protected input feature. Once a coefficient vector that optimizes an output while negating any disparity in outcome for the protected input feature is identified, an optimization model is updated with such coefficient vector for subsequent processing.

20 Claims, 10 Drawing Sheets

100

200

300

Acquire input
401

Quantize input features for binning
402

Assign each application in one bin per input feature
403

Query a model for a vector over assigned bins
404

Evaluate pricing against data for optimization targets and fairness
405

Iterate and update model parameters for optimizing output while maintaining fairness
406

Update model and apply to subsequent subjects
407

PRICING MEMBERSHIP MATRIX 'M'

| APPLICATION CODE | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 232791205351 | 1 | | | | | 1 | | | | | | 1 | | | | 1 |
| 232820933490 | 1 | | | | | | | 1 | 1 | | | | | 1 | | |
| 232821012480 | | | | | | | 1 | | 1 | | 1 | | | | | 1 |

NEW TARGET 'd'

| OBSERVATIONS | TARGET |
|---|---|
| 232791205351 | -3 |
| 232820933490 | 5 |
| 232821012480 | 7 |

OFFSETS 'v'

| BINS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| BPS | 0 | 1 | 2 | 8 | 9 | 2 | 3 | 8 | 0 | 1 | -7 | 2 | 3 | 5 | -4 | -3 |

| FICO GROUP | MIN | MAX | STEP |
|---|---|---|---|
| 770+ | -15 | 15 | 1 |
| 740-769 | -18 | 18 | 1 |
| 700-739 | -35 | 35 | 3 |
| 680-699 | -65 | 65 | 5 |
| 660-679 | -70 | 70 | 10 |
| 620-659 | -70 | 35 | 10 |
| 0-619 | -100 | 50 | 10 |

RATE ADJUSTMENT (BPS)

| -100 | -90 | -80 | -70 | -60 | -50 | -40 | -30 | -20 | -10 | 0 | +10 | +20 | +30 | +40 | +50 |
|---|---|---|---|---|---|---|---|---|---|---|---|---|---|---|---|

BASE PRICE

MIN/MAX BPS

MAX P&L

FIG. 10

SYSTEM AND METHOD FOR FAIRNESS AWARE OPTIMIZATION WITH FEATURES QUANTIZATION

TECHNICAL FIELD

This disclosure generally relates to removing potential disparity in an outcome provided by a machine learning (ML) model with respect to certain protected attributes.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Presently, various algorithms and machine learning models may be applied to numerous variables in decision making for obtaining optimal results in various applications. For example, a conventional algorithm or machine learning model may be focused on finding a balance between value and volume to maximize output for an organization as illustrated in FIG. 9. However, such conventional approach to optimization by the algorithms and machine learning models may lead to disparate results for certain protected attributes (e.g., sex, race, age) without intention and may potentially violate one or more government regulations and/or organizational operating policies.

Although an embedded bias in an algorithm or machine learning model may result in disparate outcome for certain protected attributes, even algorithms or machine learning model without such embedded bias may still provide disparate outcomes, which may run afoul of the one or more government regulations and/or organization policies.

As illustrated in FIG. 10, a conventional optimization model may apply plus or minus basis points (bps) adjustments to base pricing based on various features of a loan application to maximize profit and losses (P&L) Features of the loan application may include a particular credit score associated with the application, which may have corresponding ranges of bps adjustments possible for maximizing profit. Although the bps adjustments may be applied to maximize P&L in the example of FIG. 10, such optimization may unwittingly result in providing disparate results for certain protected groups of people having certain race, ethnicity, gender or the like, and run afoul of one or more government regulations and/or organizational operating policies.

Accordingly, for real-world applications, there is a need for computer or machine learning models that are capable of performing optimizations while avoiding disparate outcomes for one or more protected attributes, which are conventionally unavailable.

SUMMARY

The present disclosure, through one or more of its various aspects, embodiments, and/or specific features or sub-components, provides, among other features, a method for performing a fairness aware optimization on a plurality of attributes is provided. The method includes acquiring, by a processor and from a plurality of databases, an input dataset including a plurality of applications with corresponding set of input features, wherein each of the plurality of applications has a plurality of input features; quantizing, by the processor, each of the plurality of input features for the plurality of applications; performing binning, by the processor, of each of the plurality of input features quantized so that each of the plurality of input features for each of the plurality of applications is assigned to a bin among a plurality of bins to provide a matrix of bin membership for each of the plurality of applications; querying, by the processor, a machine learning (ML) model for generating a vector for each of the plurality of applications based on a corresponding matrix of bin membership; evaluating, via the ML model and for an application of the plurality of applications, the generated vector against a corresponding target value and presence of disparity in outcome for one or more of the plurality of input features, wherein the evaluating includes: generating one or more function parameters for the corresponding matrix of bin membership; generating a coefficient vector based on the one or more function parameters; generating the corresponding target value based on the matrix of bin membership and the generated coefficient vector; calculating a predicted output for the input dataset in view of the corresponding target value; and calculating for the presence of disparity in outcome for at least one of the plurality of input features; performing iterations of the evaluating, on the ML model and for remaining applications of the plurality of applications until completion; identifying, by the ML model, a target coefficient vector among a plurality of coefficient vectors generated for the plurality of applications that provides an optimized output while negating the presence of disparity in outcome; updating the ML model with the target coefficient vector; and applying the updated ML model on a subsequent application, wherein the updated ML model provides an output without disparate outcome for any input feature of the subsequent application.

In some embodiments, each of the plurality of bins are defined by a pair of boundary values.

In some embodiments, the plurality of bins are of equal size.

In some embodiments, the plurality of bins include bins of uneven sizes.

In some embodiments, the ML model is a Bayesian optimization model.

In some embodiments, each of the plurality of applications has its input features assigned to less than all of the plurality of bins.

In some embodiments, the optimized output refers to the highest output value that negates the presence of disparity in outcome for a protected feature among the plurality of input features.

In some embodiments, the protected feature is a feature regulated by a government entity.

In some embodiments, the protected feature is a race of an applicant of at least one of the plurality of applications.

In some embodiments, the protected feature is a gender of an applicant of at least one of the plurality of applications.

In some embodiments, a system for performing a fairness aware optimization on a plurality of attributes is disclosed. The system may include: a processor; and a memory operatively connected to the processor via a communication interface, the memory storing computer readable instructions, when executed, causes the processor to perform: acquiring, from a plurality of databases, an input dataset including a plurality of applications with corresponding set of input features, wherein each of the plurality of applications has a plurality of input features; quantizing each of the plurality of input features for the plurality of applications; performing binning of each of the plurality of input features quantized so that each of the plurality of input features for each of the plurality of applications is assigned to a bin among a plurality of bins to provide a matrix of bin membership for each of the plurality of applications; querying a ML model for generating a vector for each of the plurality of applications based on a corresponding matrix of bin membership; evaluating, via the ML model and for an application of the plurality of applications, the generated vector against a corresponding target value and presence of disparity in outcome for one or more of the plurality of input features, wherein the evaluating includes: generating one or more function parameters for the corresponding matrix of bin membership; generating a coefficient vector based on the one or more function parameters; generating the corresponding target value based on the matrix of bin membership and the generated coefficient vector; calculating a predicted output for the input dataset in view of the corresponding target value; and calculating for the presence of disparity in outcome for at least one of the plurality of input features; performing iterations of the evaluating, on the ML model and for remaining applications of the plurality of applications until completion; identifying, by the ML model, a target coefficient vector among a plurality of coefficient vectors generated for the plurality of applications that provides an optimized output while negating the presence of disparity in outcome; updating the ML model with the target coefficient vector; and applying the updated ML model on a subsequent application, wherein the updated ML model provides an output without disparate outcome for any input feature of the subsequent application.

In some embodiments, a non-transitory computer readable medium configured to store instructions for performing a fairness aware optimization on a plurality of attributes is disclosed. The instructions, when executed, may cause a processor to perform the following: acquiring, from a plurality of databases, an input dataset including a plurality of applications with corresponding set of input features, wherein each of the plurality of applications has a plurality of input features; quantizing each of the plurality of input features for the plurality of applications; performing binning of each of the plurality of input features quantized so that each of the plurality of input features for each of the plurality of applications is assigned to a bin among a plurality of bins to provide a matrix of bin membership for each of the plurality of applications; querying a ML model for generating a vector for each of the plurality of applications based on a corresponding matrix of bin membership; evaluating, via the ML model and for an application of the plurality of applications, the generated vector against a corresponding target value and presence of disparity in outcome for one or more of the plurality of input features, wherein the evaluating includes: generating one or more function parameters for the corresponding matrix of bin membership; generating a coefficient vector based on the one or more function parameters; generating the corresponding target value based on the matrix of bin membership and the generated coefficient vector; calculating a predicted output for the input dataset in view of the corresponding target value; and calculating for the presence of disparity in outcome for at least one of the plurality of input features; performing iterations of the evaluating, on the ML model and for remaining applications of the plurality of applications until completion; identifying, by the ML model, a target coefficient vector among a plurality of coefficient vectors generated for the plurality of applications that provides an optimized output while negating the presence of disparity in outcome; updating the ML model with the target coefficient vector; and applying the updated ML model on a subsequent application, wherein the updated ML model provides an output without disparate outcome for any input feature of the subsequent application.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 10 illustrates optimization performed in relevant art.

DETAILED DESCRIPTION

Figure 1:
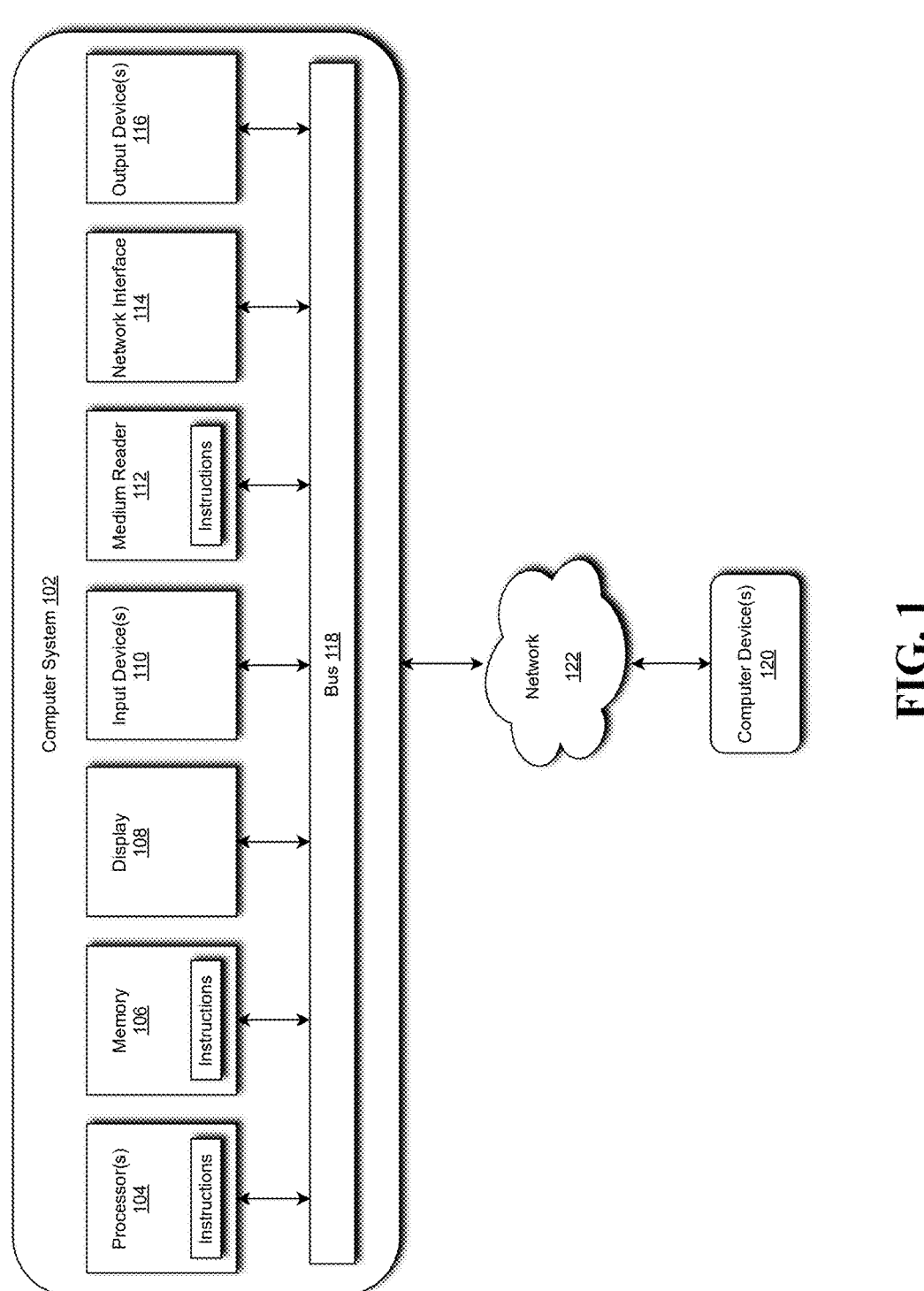
FIG. 1 illustrates a computer system for implementing a Fairness Aware Optimization (FAO) system in accordance with an embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

According to exemplary aspects, present disclosure provides a fairness aware optimization model system that is capable of accounting for bias or disparate outcomes for certain input features of a subject or application, which was unable to be accounted for under the conventional optimization models. While the conventional optimization models may be able to predict values for achieving an optimized outcome (e.g., maximized profit), the conventional optimization models were unable to recognize bias or disparate outcome for certain class of features, such as race or gender, thus requiring separate and secondary checks and analysis along with subsequent separate processing of impacted applications, which may lead to inconsistent results. In contrast, at least since the fairness aware optimization model system proactively prevents against disparate outcomes for any of the protected features, its outcomes may be utilized without requiring secondary checks and with consistent results.

FIG. 1 is a system 100 for use in implementing a Fairness Aware Optimization (FAO) system in accordance with an embodiment. The system 100 is generally shown and may include a computer system 102, which is generally indicated.

The computer system 102 may include a set of instructions that may be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions may be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a GPS device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, may be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 may be a personal computer. However, those skilled in the art appreciate that, in alternative embodiments of the present application, the computer device 120 may also be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in a non-limited embodiment, implementations can include distributed processing, component/object distributed processing, and an operation mode having parallel processing capabilities. Virtual computer system processing may be constructed to implement one or more of the methods or functionalities as described herein, and a processor described herein may be used to support a virtual processing environment.

Figure 2:
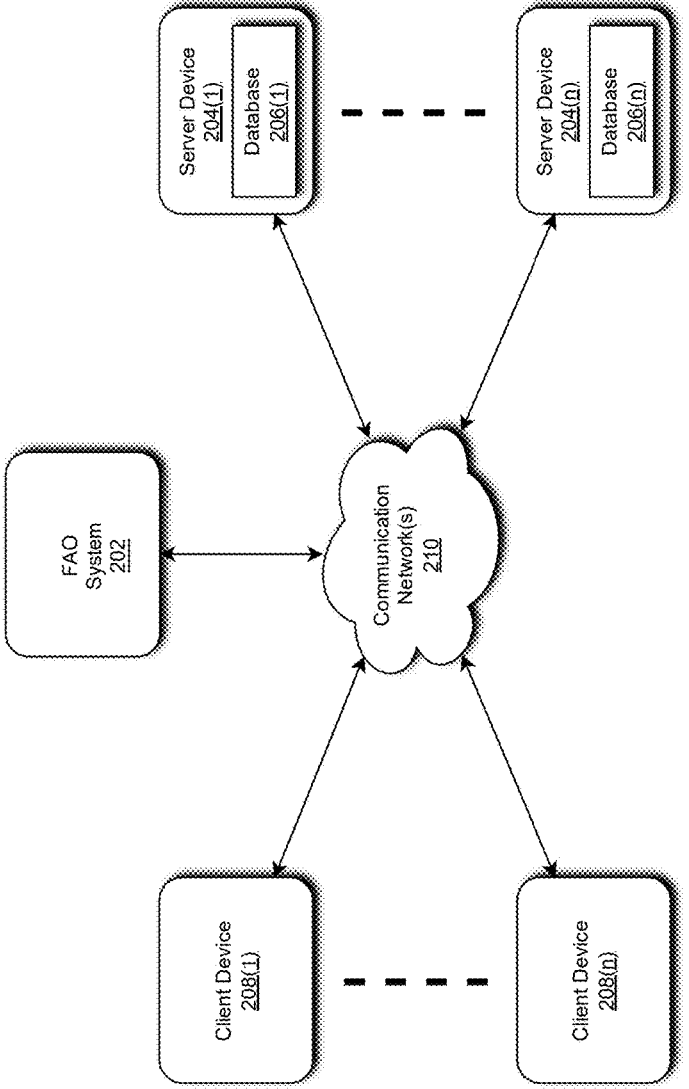
FIG. 2 illustrates a diagram of a network environment for implementing a FAO system in accordance with an embodiment.

Referring to FIG. 2, a schematic of a network environment 200 for implementing a FAO system is illustrated.

In some embodiments, the above-described problems associated with conventional optimization model may be overcome by implementing a FAO system 202 as illustrated in FIG. 2 that may be configured for implementing a FAO module configured for acquiring, from a plurality of databases, an input dataset including a plurality of applications with corresponding set of input features, wherein each of the plurality of applications has a plurality of input features; quantizing each of the plurality of input features for the plurality of applications; performing binning of each of the plurality of input features quantized so that each of the plurality of input features for each of the plurality of applications is assigned to a bin among a plurality of bins to provide a matrix of bin membership for each of the plurality of applications; querying a machine learning (ML) model for generating a vector for each of the plurality of applications based on a corresponding matrix of bin membership; evaluating, via the ML model and for an application of the plurality of applications, the generated vector against a corresponding target value and presence of disparity in outcome for one or more of the plurality of input features, wherein the evaluating includes: generating one or more function parameters for the corresponding matrix of bin membership; generating a coefficient vector based on the one or more function parameters; generating the corresponding target value based on the matrix of bin membership and the generated coefficient vector; calculating a predicted output for the input dataset in view of the corresponding target value; and calculating for the presence of disparity in outcome for at least one of the plurality of input features; performing iterations of the evaluating, on the ML model and for remaining applications of the plurality of applications until completion; identifying, by the ML model, a target coefficient vector among a plurality of coefficient vectors generated for the plurality of applications that provides an optimized output while negating the presence of disparity in outcome; updating the ML model with the target coefficient vector; and applying the updated ML model on a subsequent application, wherein the updated ML model provides an output without disparate outcome for any input feature of the subsequent application.

The FAO system 202 may include one or more computer system 102*s*, as described with respect to FIG. 1, which in aggregate provides the necessary functions.

The FAO system 202 may store one or more applications that can include executable instructions that, when executed by the FAO system 202, cause the FAO system 202 to perform actions, such as to transmit, receive, or otherwise process network messages, for example, and to perform other actions described and illustrated below with reference to the figures. The application(s) may be implemented as modules or components of other applications. Further, the application(s) may be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the FAO system 202 itself, may be located in virtual server(s) running in a cloud-based computing environment rather than being tied to one or more specific physical network computing devices. Also, the application(s) may be running in one or more virtual machines (VMs) executing on the FAO system 202. Additionally, in one or more embodiments of this technology, virtual machine(s) running on the FAO system 202 may be managed or supervised by a hypervisor.

In the network environment 200 of FIG. 2, the FAO system 202 may be coupled to a plurality of server devices 204(1)-204(*n*) that hosts a plurality of databases 206(1)- 206(*n*), and also to a plurality of client devices 208(1)- 208(*n*) via communication network(s) 210. A communication interface of the FAO system 202, such as the network interface 114 of the computer system 102 of FIG. 1, operatively couples and communicates between the FAO system 202, the server devices 204(1)-204(*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the FAO system 202, the server devices 204(1)- 204(*n*), and/or the client devices 208(1)-208(*n*) may be coupled together via other topologies. Additionally, the network environment 200 may include other network devices such as one or more routers and/or switches, for example, which are well known in the art and thus will not be described herein.

By way of example only, the communication network(s) 210 may include local area network(s)(LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The FAO system 202 may be a standalone device or integrated with one or more other devices or apparatuses, such as one or more of the server devices 204(1)-204(*n*), for example. In one particular example, the FAO system 202 may be hosted by one of the server devices 204(1)-204(*n*), and other arrangements are also possible. Moreover, one or more of the devices of the FAO system 202 may be in the same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)- 204(*n*) may include, among other features, one or more processors, a memory, and a communication interface, which are coupled together by a bus or other communication link, although other numbers and/or types of network devices may be used. The server devices 204(1)-204(*n*) in this example may process requests received from the FAO system 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)- 206(*n*) that are configured to store metadata sets, data quality rules, and newly generated data.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204 (1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(*n*) or other client devices 208(1)-208(*n*).

In some embodiments, the client devices 208(1)-208(*n*) in this example may include any type of computing device that can facilitate the implementation of the FAO system 202 that may efficiently provide a FAO module configured for acquiring, from a plurality of databases, an input dataset including a plurality of applications with corresponding set of input features, wherein each of the plurality of applications has a plurality of input features; quantizing each of the plurality of input features for the plurality of applications; performing binning of each of the plurality of input features quantized so that each of the plurality of input features for each of the plurality of applications is assigned to a bin among a plurality of bins to provide a matrix of bin membership for each of the plurality of applications; querying a machine learning (ML) model for generating a vector for each of the plurality of applications based on a corresponding matrix of bin membership; evaluating, via the ML model and for an application of the plurality of applications, the generated vector against a corresponding target value and presence of disparity in outcome for one or more of the plurality of input features, wherein the evaluating includes: generating one or more function parameters for the corresponding matrix of bin membership; generating a coefficient vector based on the one or more function parameters; generating the corresponding target value based on the matrix of bin membership and the generated coefficient vector; calculating a predicted output for the input dataset in view of the corresponding target value; and calculating for the presence of disparity in outcome for at least one of the plurality of input features; performing iterations of the evaluating, on the ML model and for remaining applications of the plurality of applications until completion; identifying, by the ML model, a target coefficient vector among a plurality of coefficient vectors generated for the plurality of applications that provides an optimized output while negating the presence of disparity in outcome; updating the ML model with the target coefficient vector; and applying the updated ML model on a subsequent application, wherein the updated ML model provides an output without disparate outcome for any input feature of the subsequent application.

The client devices 208(1)-208(n) may run interface applications, such as standard web browsers or standalone client applications, which may provide an interface to communicate with the FAO system 202 via the communication network(s) 210 in order to communicate user requests. The client devices 208(1)-208(n) may further include, among other features, a display device, such as a display screen or touchscreen, and/or an input device, such as a keyboard, for example.

Although the network environment 200 with the FAO system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the FAO system 202, the server devices 204(1)-204(n), or the client devices 208(1)-208(n), for example, may be configured to operate as virtual instances on the same physical machine. For example, one or more of the FAO system 202, the server devices 204(1)-204(n), or the client devices 208(1)-208(n) may operate on the same physical device rather than as separate devices communicating through communication network(s) 210. Additionally, there may be more or fewer FAO system s 202, server devices 204(1)-204(n), or client devices 208(1)-208(n) than illustrated in FIG. 2. In some embodiments, the FAO system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
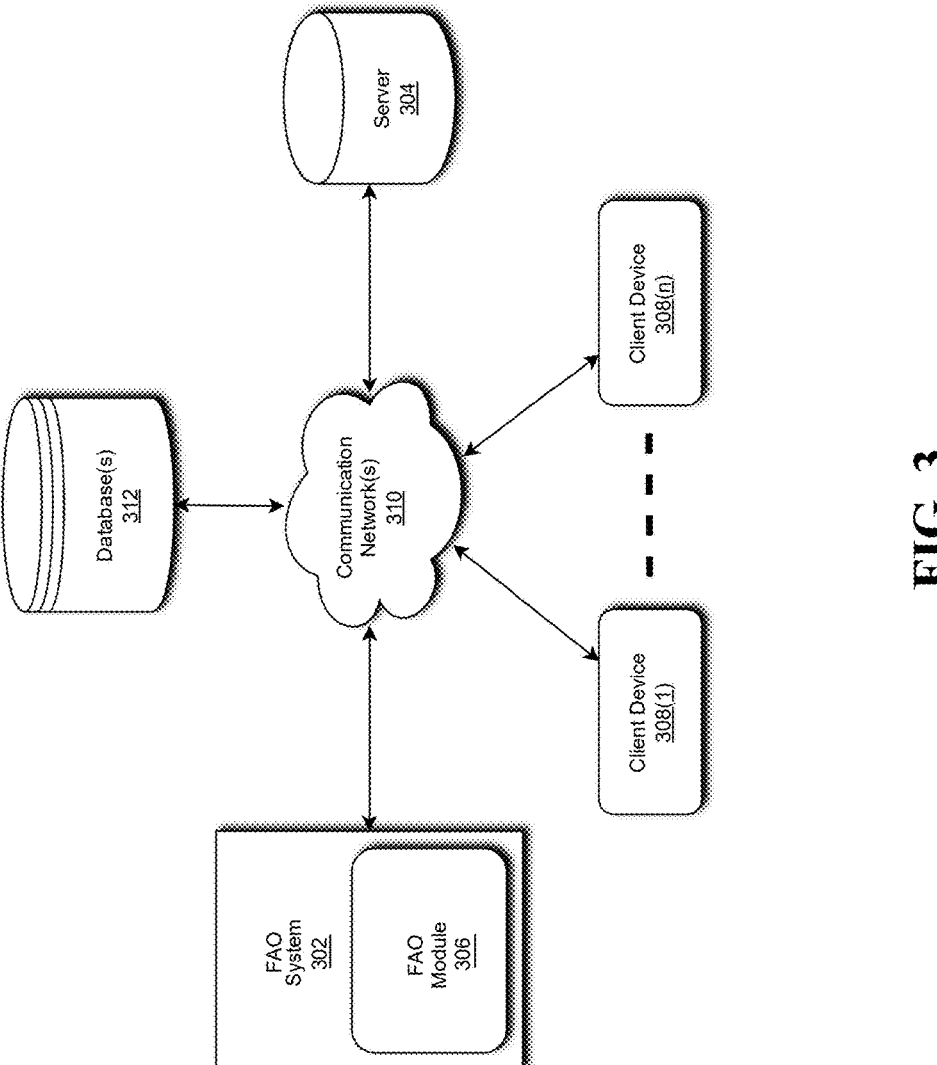
FIG. 3 illustrates a system configuration diagram for implementing a FAO system in accordance with an embodiment.

FIG. 3 illustrates a system configuration diagram for implementing a FAO system in accordance with an embodiment.

As illustrated in FIG. 3, the system 300 may include a FAO system 302 within which a FAO module 306 is embedded, a server 304, a database(s) 312, a plurality of client devices 308(1) . . . 308(n), and a communication network 310.

In some embodiments, the FAO system 302 including the FAO module 306 may be connected to the server 304, and the database(s) 312 via the communication network 310. The FAO system 302 may also be connected to the plurality of client devices 308(1) . . . 308(n) via the communication network 310, but the disclosure is not limited thereto. The database(s) 312 may include one or more rule databases.

In an embodiment, the FAO system 302 is described and shown in FIG. 3 as including the FAO module 306, although it may include other rules, policies, modules, databases, or applications, for example. In some embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) 312 may be a mainframe database, a log database that may produce programming for searching, monitoring, and analyzing machine-generated data via a web interface, etc., but the disclosure is not limited thereto. In addition, the database(s) 312 may store the large code bases models as directed graphs and graph metrics and graph centrality measures.

In some embodiments, the FAO module 306 may be configured to receive real-time feed of data from the plurality of client devices 308(1) . . . 308(n) and secondary sources via the communication network 310.

The FAO module 306 may be configured to perform: generating a simulation model with at least two independent computer agents with at least one communication provided between the at least two independent computer agents; initializing each of the at least two independent computer agents; executing the simulation model for performing a simulation until a stable state is established in the simulation; initiating at least one exogeneous shock to the simulation model after the stable state is established in the simulation; capturing reactionary data from the at least two independent computer agents; and independently performing, via machine learning, reinforcement learning for each of the at least two independent computer agents, but the disclosure is not limited thereto.

The plurality of client devices 308(1) . . . 308(n) are illustrated as being in communication with the FAO system 302. In this regard, the plurality of client devices 308(1) . . . 308(n) may be "clients" (e.g., customers) of the FAO system 302 and are described herein as such. Nevertheless, it is to be known and understood that the plurality of client devices 308(1) . . . 308(n) need not necessarily be "clients" of the FAO system 302, or any entity described in association therewith herein. Any additional or alternative relationship may exist between either or both of the plurality of client devices 308(1) . . . 308(n) and the FAO system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. In some embodiments, the server 304 may be the same or equivalent to the server device 204 as illustrated in FIG. 2.

The process may be executed via the communication network 310, which may comprise plural networks as described above. For example, in an embodiment, one or more of the plurality of client devices 308(1) . . . 308(n) may communicate with the FAO system 302 via broadband or cellular communication. Of course, these embodiments are merely exemplary and are not limiting or exhaustive.

The plurality of client devices 308(1) . . . 308(n) may be the same or similar to any one of the client devices 208(1)-208(n) as described with respect to FIG. 2, including any features or combination of features described with respect thereto. The FAO system 302 may be the same or similar to the FAO system 202 as described with respect to FIG. 2, including any features or combination of features described with respect thereto.

Figure 4:
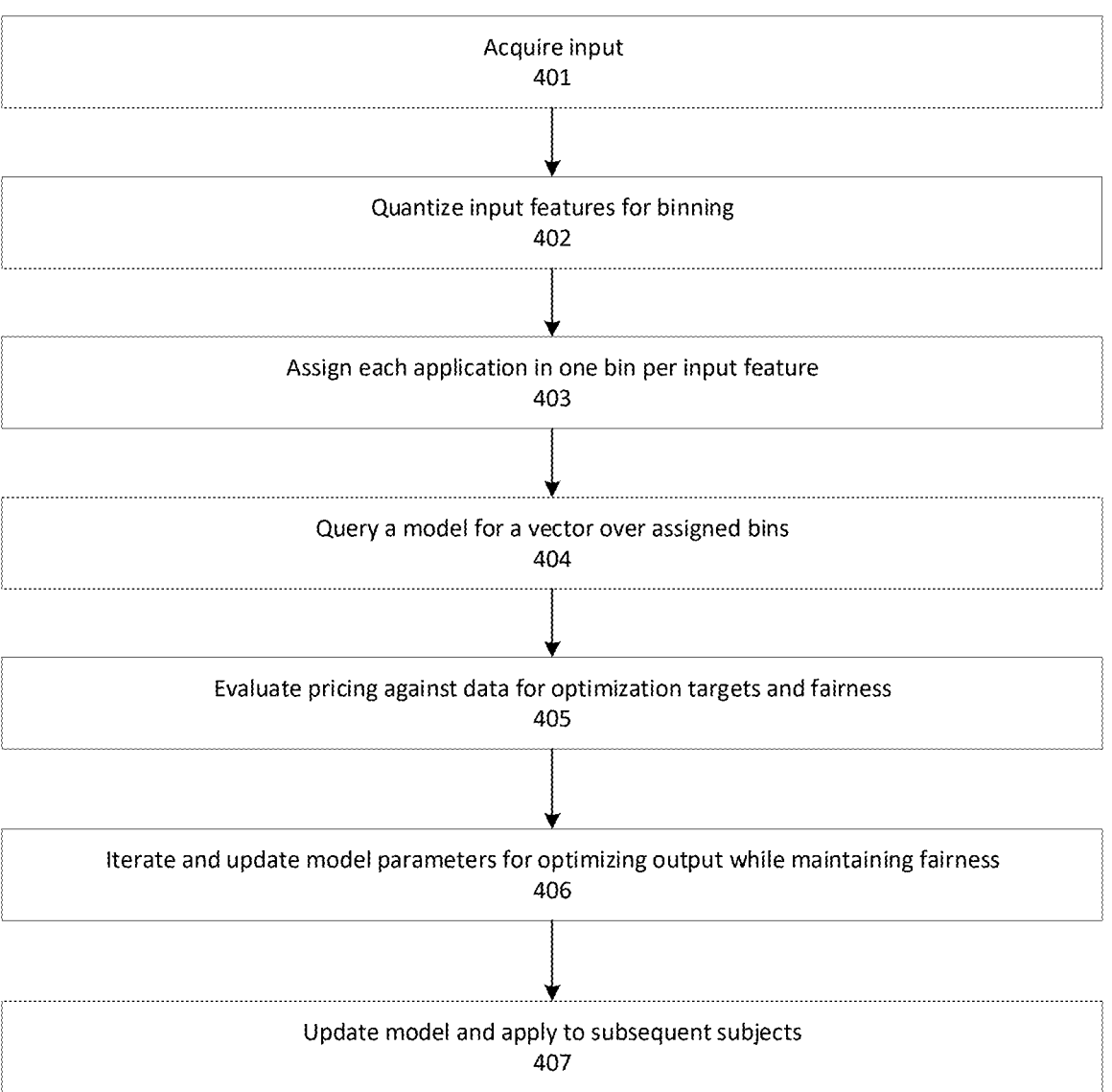
FIG. 4 illustrates a method for performing preprocessing operations on input features for performing machine learning optimization while ensuring fairness in outcome in accordance with an embodiment.

FIG. 4 illustrates a method for performing preprocessing operations on input features for performing machine learning optimization while ensuring fairness in outcome in accordance with an embodiment.

According to aspects, an optimization performed using an ML model may attempt to process various inputs and/or attributes to output a value that may likely provide a highest probable value. In its pursuit of achieving optimization, which may be evaluated in terms of numerical value (e.g., highest profit margins), the respective ML model may not account for any resulting bias or disparity provided by the ML model (e.g., higher rejection or interest rates for certain racial groups). However, such theoretical optimization would not realistically be applied in a real-world scenario, as such outcomes may be prohibited and scrutinized by one or more government regulations and/or corporate policies. Accordingly, an outcome outputted by such an ML model may not directly be provided to an end user in a seamless manner, as such outputs by the ML model may require offline processing by an intermediary to ensure disparate results are not generated by the ML model.

Aspects of the present disclosure provides a machine learning model that performs optimization while accounting for fairness in outcome to avoid disparate outcome for any protected groups of people to ensure more appropriate and applicable outcome that may directly be implemented in a real-world scenario without invoking scrutiny by government or overseeing bodies or organizations. Accordingly, aspects of the present disclosure provides a novel ML model that is able to perform fairness aware optimization that was incapable by conventional ML or computing models. Example method for generating the fairness aware ML model is described in further detail below.

In order to ensure fairness is achieved when executing an ML or AI model or technique for optimization, preprocessing operations may be performed on the input features for quantization and grouping of similar instances into bins based on the quantized values. Then for each of the bins, an offset value that may adjust a regression target for those similar instances, such as those belonging in the same bin, may be learned via iterations in an ML or AI algorithm or model. Accordingly, unlike conventional optimization processing that performs optimization at an individual level, an offset may be applied to the optimization model at a bin level to ensure disparate results against certain protected groups may be avoided.

In an example, AI or ML algorithms may be generative, in that the AI or ML algorithms may be executed to perform data pattern detection, and to provide an output based on the data pattern detection. More specifically, an output may be provided based on a historical pattern of data, such that with more data or more recent data, more accurate outputs may be provided. Accordingly, the ML or AI models may be constantly updated after a predetermined number of runs or iterations are initially performed to provide initial training. According to exemplary aspects, machine learning may refer to computer algorithms that may improve automatically through use of data. Machine learning algorithm may build an initial model based on sample or training data, which may be iteratively improved upon as additional data are acquired.

More specifically, machine learning/artificial intelligence and pattern recognition may include supervised learning algorithms such as, for example, k-medoids analysis, regression analysis, decision tree analysis, random forest analysis, k-nearest neighbors analysis, logistic regression analysis, N-fold cross-validation analysis, balanced class weight analysis, and the like. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, and the like.

In another exemplary embodiment, the ML or AI model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the ML or AI model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the ML or AI models may be generated using at least one from among an artificial neural network technique, a decision tree technique, a support vector machines technique, a Bayesian network technique, and a genetic algorithms technique.

In operation 401, input features are acquired from one or more databases over a network. According to example aspects, input features acquired may vary according to one or more processes to be executed by an ML model or algorithm. Moreover, the input features to be acquired for processing may be change as the ML model is updated based on further training and back propagation.

According to example aspects, the input features may include, without limitation, application identification number, gender, race, nationality, loan amount, credit score (e.g., Fair Isaac Corporation (FICO®) score), length of employment, income, debt and the like. However, aspects of the present disclosure are not limited thereto, such that different attributes associated with an individual, an object or entity may be utilized as input features. In an example, the input features may correspond to input values provided for applying for a particular loan or a decision requiring an approval (e.g., job application, college application, scholarship application and the like). Further, one or more input features may be associated with one or more government protected groups, such as gender and/or race.

Moreover, at least one or more input features may be provided directly by an application or inferred using an ML model.

In operation 402, the acquired input features may then be quantized. In an example, the each of the acquired input features may be quantized in order to group instances of similar feature values into bins. According to example aspects, binning or bucketing may refer to a feature engineering processing that may group or cluster different values or numerical subranges into bins or buckets. For example, credit scores may be quantized and assigned to a bin or a bucket designated for a range of numerical values. Age may similarly be quantized and binned according to a range of ages, which may or may not be evenly distributed. Moreover, values like gender or race may also be quantized and binned or clustered according to their respective values. In an example, each of the bins may be defined by its edges or boundaries. Further, each of the bins may be of equal size or different sizes.

Figure 5:
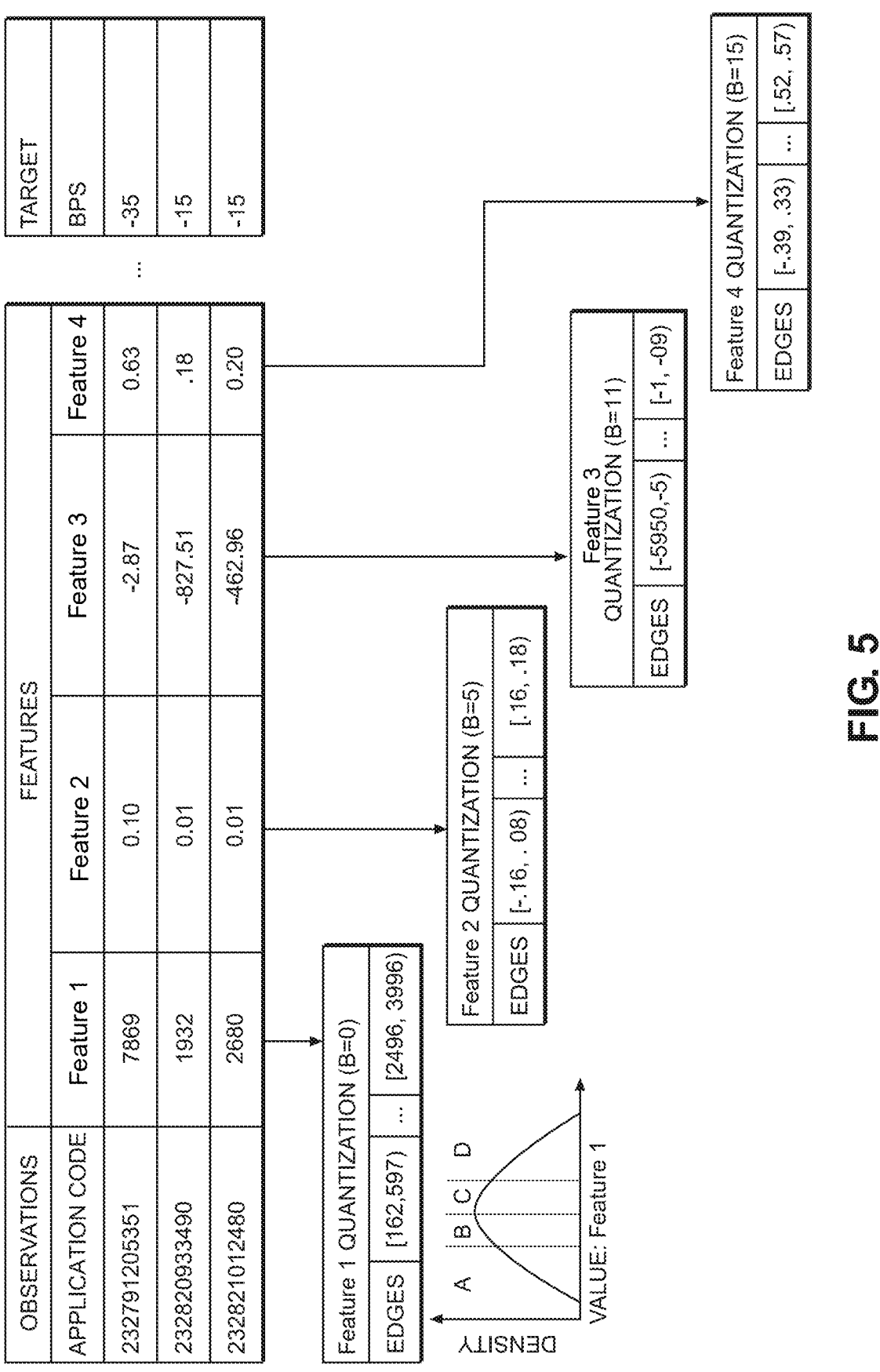
FIG. 5 illustrates quantization of input features prior to performing machine learning optimization in accordance with an embodiment.

FIG. 5 illustrates quantization of input features prior to performing machine learning optimization in accordance with an embodiment. According to aspects of the present disclosure, a number of input features may be associated with a subject. In an example, the subject may refer to an application by an individual, and the input features may refer to various attributes of the individual. In an example, input features may include income, gender, age, race, primary language, credit score, length of residency and the like. According to further aspects, input features associated with the subject may be selectively quantized. For example, if an input feature associated with the subject is determined to have little to or no impact in generating an offset or providing optimizing an output, such input features may not be quantized to conserve unnecessarily computing power utilization. In another example, if the input features are already quantized, no additional quantization may be required for performing corresponding binning. However, aspects of the present disclosure are not limited thereto, such that even the numerical values corresponding to an input feature may be further quantized for binning.

Once quantized, ranges of quantized values may form various bins. According to example aspects, the ranges forming the corresponding bins may be evenly distributed or may be distributed based on distribution data. For example, a range of values corresponding to a first bin may be equal to, smaller than or larger than a range of values corresponding to a second bin. According to aspects, binning methodology may include, without limitation, equal interval binning, quantile binning, or custom binning. Each bin may be defined by bin edges, which may be defined according to a binning methodology applied to the dataset. In an example, same or different binning methodology may be applied for each of the input features.

In operation 403, input features of each subject, such as an application, are assigned to their respective bins among a plurality of available bins to provide a matrix of bin membership. According to exemplary aspects, each input feature may correspond to a corresponding bin, such that one input feature may correspond to one bin. However, aspects of the present disclosure are not limited thereto, such that certain input features may be assigned to multiple or no bins in certain instances.

For example, for the credit score feature, seven bins may be set. First bin may include credit scores 770 and up. Second bin may include credit score range of 740-769. Third bin may include a credit score range of 700-739. Fourth bin may include a credit score range of 680-699. Fifth bin may include a credit score range of 660-679. Sixth bin may include a credit score range of 620-659. Seventh bin may include a credit score range of 0-619. According to example aspects, each application may be assigned to one of these seven bins after quantization for the credit score feature. Moreover, each of the bins may be associated with a corresponding feature vector.

Figure 6:
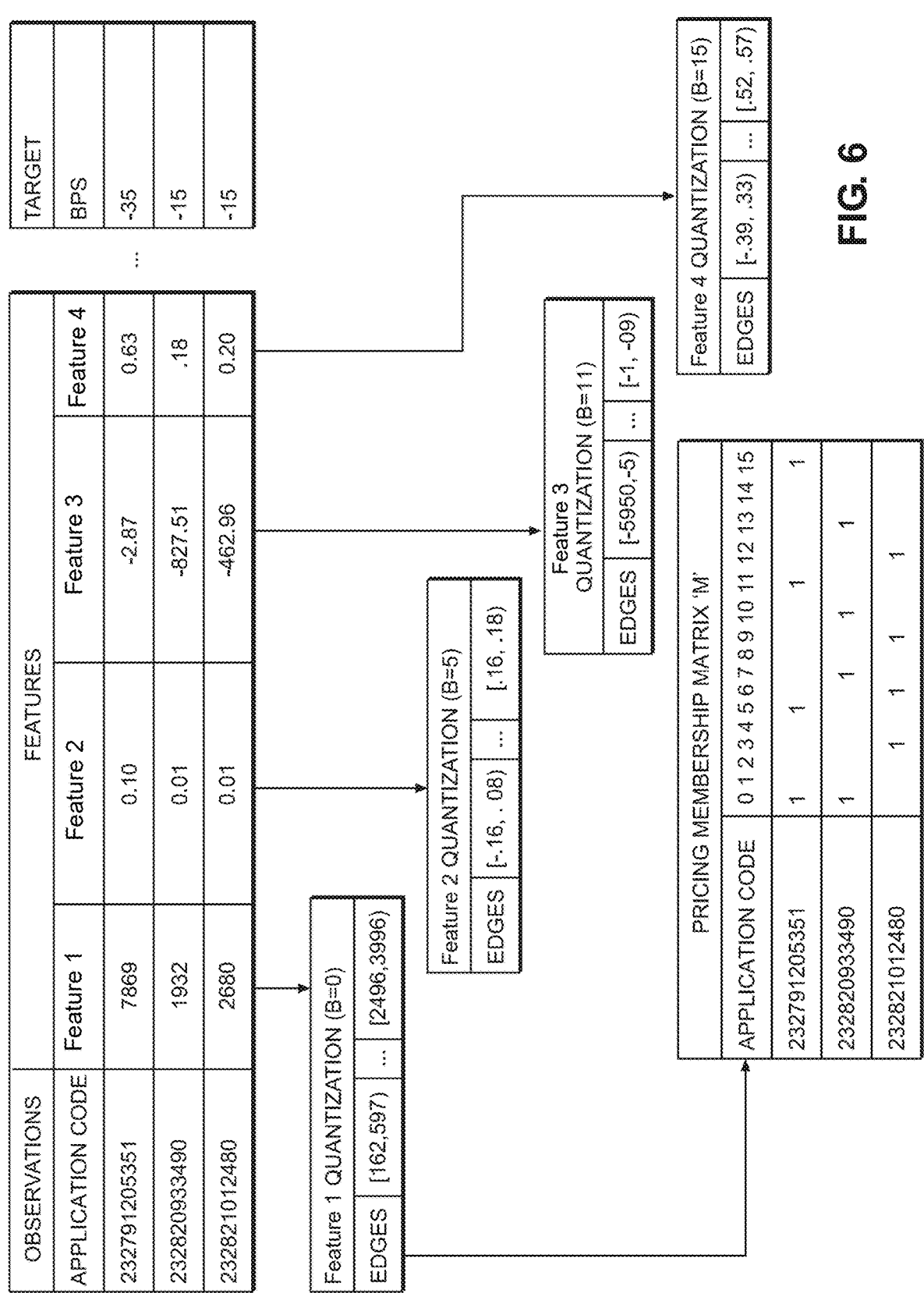
FIG. 6 illustrates binning of input features of a subject in accordance with an embodiment.

Binning of input features of an application or a subject is exemplarily illustrated in FIG. 6. FIG. 6 illustrates binning of input features of a subject in accordance with an embodiment. As exemplarily illustrated in FIG. 6, each input feature of a subject or application code assigned to a corresponding bin to generate a sparse matrix of bin assignments or membership. More specifically, input features of Application Code 232791205351 may be assigned to bin 0, bin 5, bin 11 and bin 15. Similarly, input features of Application Code 232820933490 may be assigned to bin 0, bin 7, bin 11 and bin 13. Although four input features and sixteen bins are illustrated, aspects of the present disclosure are not limited thereto such that different number of input features and bins may be utilized.

In operation 404, the ML model may be queried for generating a pricing vector or surrogate function parameters for each subject or application based on the matrix of bin assignment or membership for the respective subject or application. More specifically, each bin may provide a corresponding feature vector value or function parameter. Accordingly, each application or subject may be characterized by multiple dimensions or vectors based on the matrix of assigned bins. Based on such dimensions provided by the binned data, a price vector may be identified for each of the applications. For example, a pricing vector may be identified for Application Code 232791205351 based on assignment of its corresponding features to bin 0, bin 5, bin 11 and bin 15.

In operation 405, the ML model may be queried to identify an offset value or vector coefficient that may be applied to the identified pricing vectors for optimizing an output while the identified pricing vector is then evaluated against data for optimization while maintaining fairness. According to aspects of the present disclosure, the identified pricing vector may be associated with zero or no offset value or previously applied offset values if the respective pricing vector is a subsequent iteration of evaluation. In an example, based on the initial offset vector of zero, an optimization offset value may be determined for each of the bins using the identified pricing vectors for the subjects or applications. Further, based on the determined optimized offset values, a new target value 'd' or optimized output value may be determined for further evaluation.

Figure 7:
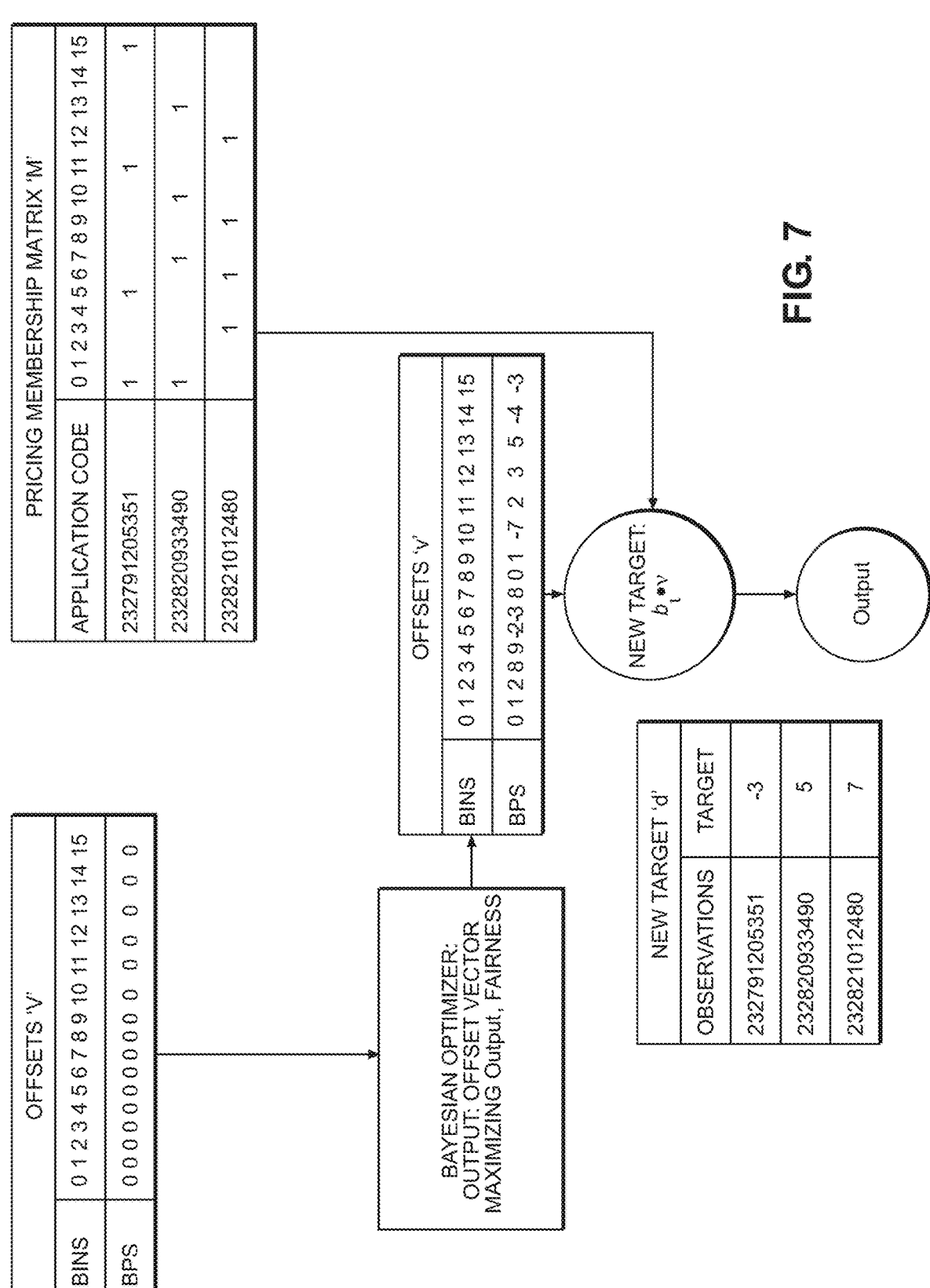
FIG. 7 illustrates applying an offset based on vectorization of binning data and optimizing with the applied offset in accordance with an embodiment.

FIG. 7 illustrates applying an offset based on vectorization of binning data and optimizing with the applied offset in accordance with an embodiment. As illustrated in FIG. 7, the initial offset vector values of zeros may be applied to each of the bins for determination of baseline optimized target values. Although initial offset vector values of zeros are shown, aspects of the present disclosure are not limited thereto, such that the initial offset vector values may be non-zero values and instead show a previously determined offset vector values. As further illustrated in FIG. 7, the initial offset vector values are then inputted to an ML model, such as Bayesian optimizer model, for generating an offset vector that may maximize the output value, such as maximum profit. Then utilizing the generated offset vector values for each of the respective bins along with the pricing vector identified in operation 404, a new target values 'd' are identified, and predicted output or profit is determined.

In operation 406, the ML model may perform one or more training iterations and updated until requisite fairness level is achieved with respect to one or more input features. Further, parameters of the ML model achieving the requisite fairness level is then captured and saved for subsequent processing. According to exemplary aspects, one of the parameters of the ML model that achieves of the requisite fairness level may be an offset value, such as a bps offset value, for each bin that will adjust the regression target for the instances grouped into a particular bin. An example process flow illustrating the iterations performed for identifying the optimal offset values for attaining optimized output while maintaining fairness (e.g., avoidance of disparate outcome for protected features or demographic) is provided in FIG. 8.

Figure 8:
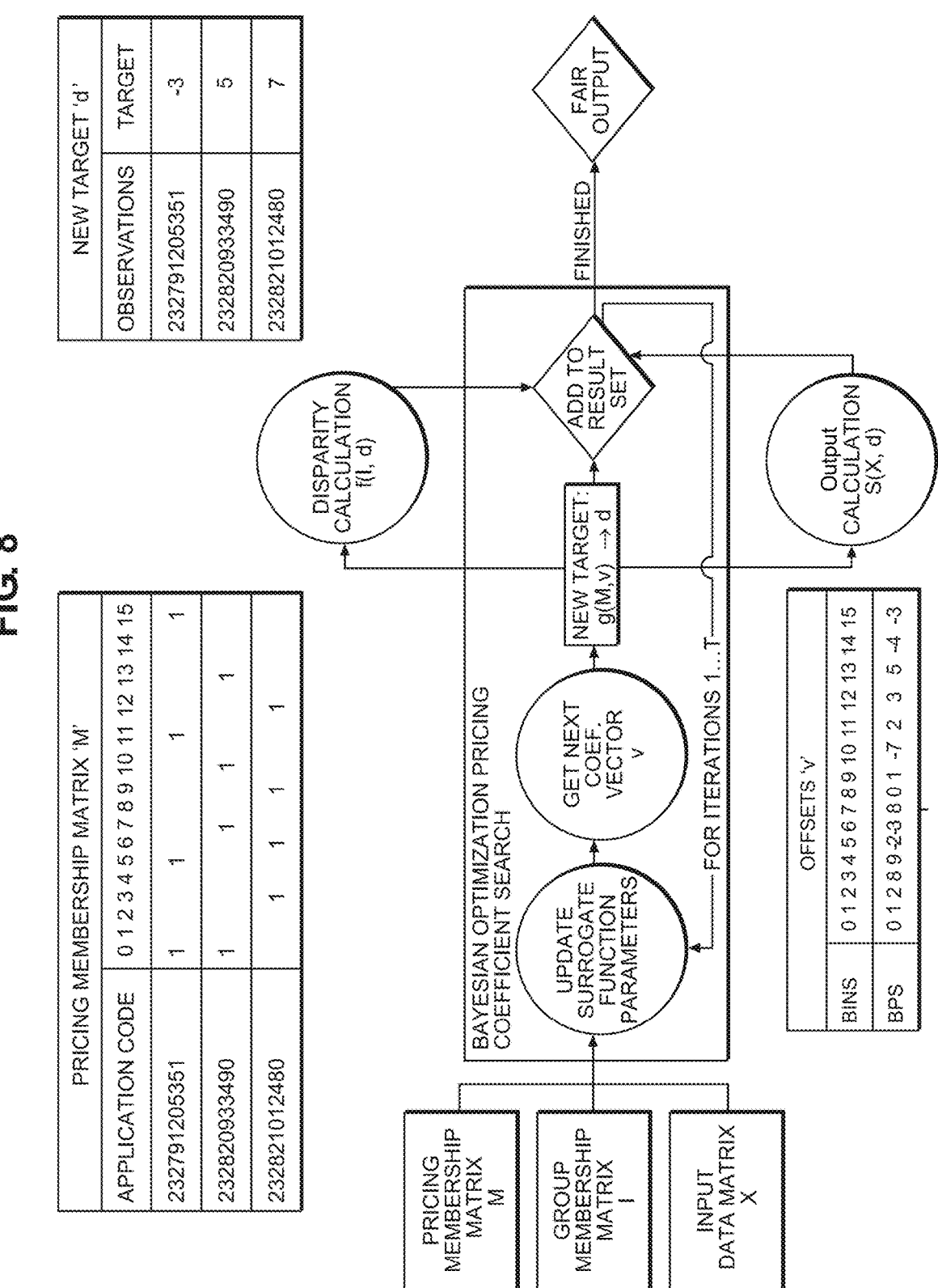
FIG. 8 illustrates iterative processing for identifying a coefficient vector to apply in Fairness Aware Optimization in accordance with an embodiment.
Figure 9:
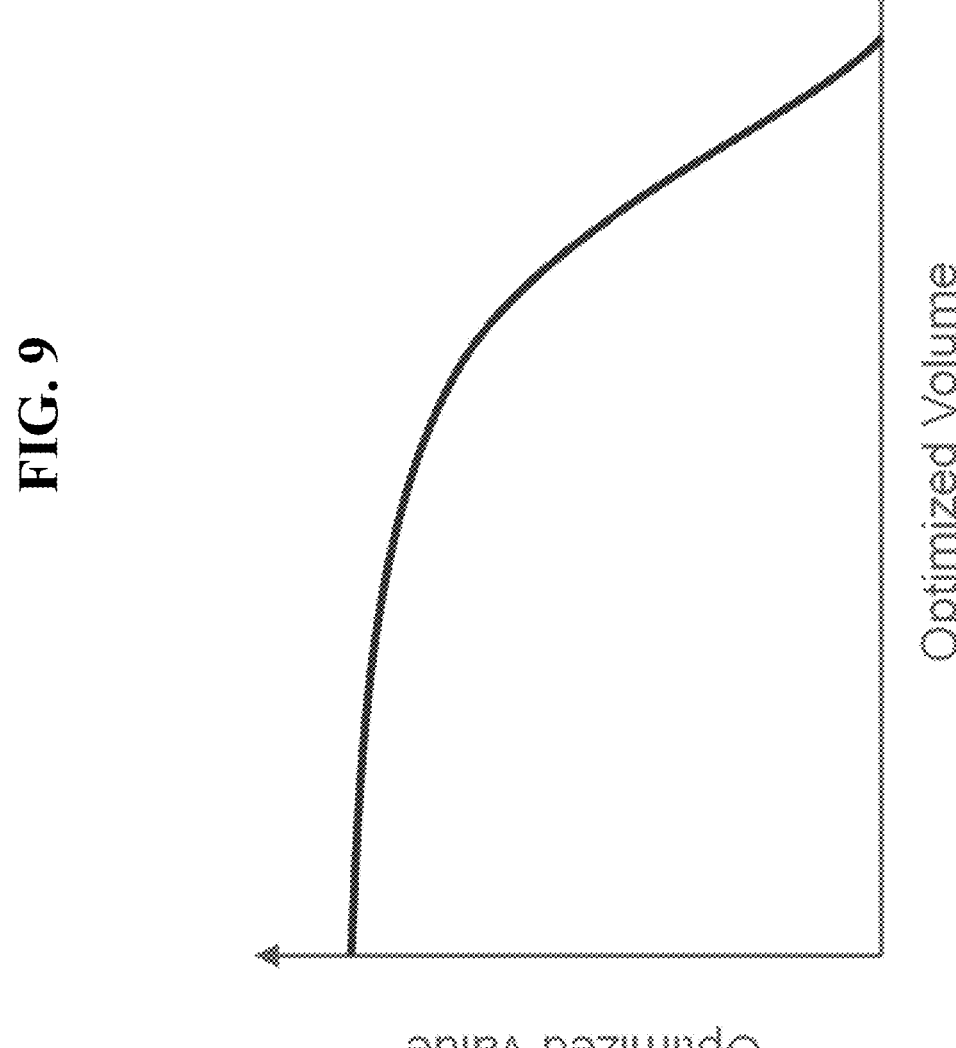
FIG. 9 illustrates considerations made for achieving optimization in relevant art.

FIG. 8 illustrates iterative processing for identifying a coefficient vector to apply in Fairness Aware Optimization in accordance with an embodiment. As illustrated in FIG. 8, various input matrices may be inputted to the ML model for performing the Bayesian optimization pricing coefficient search. Input matrices includes a pricing membership matrix M, a group membership matrix I, and an input data matrix X. Input data matrix X may refer to a matrix of raw data and acquired from one or more databases. In an example, the group membership matrix I may refer to groupings of quantized information, such as bins or clusters with boundaries that may be formed from quantized input data. Lastly, the pricing membership matrix M may refer to sparse matrix of bin membership based on the quantized input data. However, aspects of the present disclosure are not limited thereto, such that different set and/or number of input matrices may be utilized.

Based on the received input, surrogate function parameters may be provided or updated. According example aspects, the surrogate function parameters may refer to parameters of a statistical model that approximates the actual objective function, which may allow for efficient exploration of search space by providing predictions and uncertainty estimates about the function's behavior at unobserved points. Based on the surrogate function parameters, which may be updated at each iteration, a next coefficient vector 'v' may be generated. Based on the generated coefficient vector 'v' and the pricing membership matrix M, a new optimized target value 'd' may be obtained. Based on the new optimized target value 'd', two separate calculations may be performed: one for optimizing profit by taking a function S of input data matrix X and the new optimized target value 'd', and another for calculating of disparity based on a function f of the group membership matrix I and the new optimized target value 'd'. Both of these calculations are added to the result set and evaluated to determine whether the generated coefficient vector 'v' provides an optimize output that avoids disparate outcome for protected feature classes (e.g., race, gender and the like). The above noted process may be iterated for a number of input datasets and once all of the datasets have been processed, the coefficient vector 'v' providing the optimal outcome while maintaining fairness may be selected and outputted.

In operation 407, once the optimized model parameters, such as coefficient vector, for providing an optimized output while ensuring fairness in outcome are identified, the ML model may be updated for subsequent processing of input data, such as application data for jobs, loans, colleges and the like. Accordingly, fairness in outcome for certain protected classes of people (based on their input features) may be ensured even when an ML models are utilized for predicting optimized outcome based on objective data, for wider application of technology with reduced supervision and downtimes associated with conventional ML optimization model technology. Such reduction of downtimes and supervision, which may require additional running of computerized algorithms or manual processing, will increase efficiency of the respective ML optimization model.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium may be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, may be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing a fairness aware optimization on a plurality of attributes, the method comprising:

acquiring, by a processor and from a plurality of databases, an input dataset including a plurality of applications with corresponding set of input features, wherein each of the plurality of applications has a plurality of input features;

quantizing, by the processor, each of the plurality of input features for the plurality of applications;

performing binning, by the processor, of each of the plurality of input features quantized so that each of the plurality of input features for each of the plurality of applications is assigned to a bin among a plurality of bins to provide a matrix of bin membership for each of the plurality of applications;

querying, by the processor, a machine learning (ML) model for generating a vector for each of the plurality of applications based on a corresponding matrix of bin membership, wherein each of the plurality of bins is associated with a corresponding vector, such that each of the plurality of applications is characterized by a plurality of vectors based on the matrix of bin membership;

evaluating, via the ML model and for an application of the plurality of applications, the generated vector against a corresponding target value and presence of disparity in outcome for one or more of the plurality of input features, wherein the evaluating includes:

generating one or more function parameters for the corresponding matrix of bin membership;

generating a coefficient vector based on the one or more function parameters;

generating the corresponding target value based on the matrix of bin membership and the generated coefficient vector;

calculating a predicted output for the input dataset in view of the corresponding target value; and calculating for the presence of disparity in outcome for at least one of the plurality of input features;

performing one or more training iterations of the evaluating, on the ML model and for remaining applications of the plurality of applications until an offset value for each bin that adjusts a regression target for input features grouped into a particular bin is determined;

identifying, by the ML model and based on performance of the one or more training iterations on the ML model, a target coefficient vector among a plurality of coefficient vectors generated for the plurality of applications that provides an optimized output while negating the presence of disparity in outcome;

storing one or more function parameters including the identified target coefficient vector, and updating the ML model with the target coefficient vector, wherein the stored one or more function parameters approximate an objective function of the ML model to limit search space for more efficient exploration with respect to unobserved points; and applying the updated ML model on a subsequent application, wherein the updated ML model applies the offset at a bin level to provide an output without disparate outcome for any input feature of the subsequent application.

2. The method according to claim 1, wherein each of the plurality of bins are defined by a pair of boundary values.

3. The method according to claim 1, wherein the plurality of bins are of equal size.

4. The method according to claim 1, wherein the plurality of bins include bins of uneven sizes.

5. The method according to claim 1, wherein the ML model is a Bayesian optimization model.

6. The method according to claim 1, wherein each of the plurality of applications has its input features assigned to less than all of the plurality of bins.

7. The method according to claim 1, wherein the optimized output refers to a highest output value that negates the presence of disparity in outcome for a protected feature among the plurality of input features.

8. The method according to claim 7, wherein the protected feature is a feature regulated by a government entity.

9. The method according to claim 7, wherein the protected feature is a race of an applicant of at least one of the plurality of applications.

10. The method according to claim 7, wherein the protected feature is a gender of an applicant of at least one of the plurality of applications.

11. A system for performing a fairness aware optimization on a plurality of attributes, the system comprising:

a processor; and a memory operatively connected to the processor via a communication interface, the memory storing computer readable instructions, when executed, causes the processor to perform:

acquiring, from a plurality of databases, an input dataset including a plurality of applications with corresponding set of input features, wherein each of the plurality of applications has a plurality of input features;

quantizing each of the plurality of input features for the plurality of applications;

performing binning of each of the plurality of input features quantized so that each of the plurality of input features for each of the plurality of applications is assigned to a bin among a plurality of bins to provide a matrix of bin membership for each of the plurality of applications;

querying a machine learning (ML) model for generating a vector for each of the plurality of applications based on a corresponding matrix of bin membership, wherein each of the plurality of bins is associated with a corresponding vector, such that each of the plurality of applications is characterized by a plurality of vectors based on the matrix of bin membership;

evaluating, via the ML model and for an application of the plurality of applications, the generated vector against a corresponding target value and presence of disparity in outcome for one or more of the plurality of input features, wherein the evaluating includes:

generating one or more function parameters for the corresponding matrix of bin membership;

generating a coefficient vector based on the one or more function parameters;

generating the corresponding target value based on the matrix of bin membership and the generated coefficient vector;

calculating a predicted output for the input dataset in view of the corresponding target value; and calculating for the presence of disparity in outcome for at least one of the plurality of input features;

performing one or more training iterations of the evaluating, on the ML model and for remaining applications of the plurality of applications until an offset value for each bin that adjusts a regression target for input features grouped into a particular bin is determined;

identifying, by the ML model and based on performance of the one or more training iterations on the ML model, a target coefficient vector among a plurality of coefficient vectors generated for the plurality of applications that provides an optimized output while negating the presence of disparity in outcome;

storing one or more function parameters including the identified target coefficient vector, and updating the ML model with the target coefficient vector, wherein the stored one or more function parameters approximate an objective function of the ML model to limit search space for more efficient exploration with respect to unobserved points; and applying the updated ML model on a subsequent application, wherein the updated ML model applies the offset at a bin level to provide an output without disparate outcome for any input feature of the subsequent application.

12. The system according to claim 11, wherein each of the plurality of bins are defined by a pair of boundary values.

13. The system according to claim 11, wherein the plurality of bins are of equal size.

14. The system according to claim 11, wherein the plurality of bins include bins of uneven sizes.

15. The system according to claim 11, wherein the ML model is a Bayesian optimization model.

16. The system according to claim 11, wherein the optimized output refers to a highest output value that negates the presence of disparity in outcome for a protected feature among the plurality of input features.

17. The system according to claim 16, wherein the protected feature is a feature regulated by a government entity.

18. The system according to claim 16, wherein the protected feature is a race of an applicant of at least one of the plurality of applications.

19. The system according to claim 16, wherein the protected feature is a gender of an applicant of at least one of the plurality of applications.

20. A non-transitory computer readable medium configured to store instructions for performing a fairness aware optimization on a plurality of attributes, when executed, cause a processor to perform:

acquiring, from a plurality of databases, an input dataset including a plurality of applications with corresponding set of input features, wherein each of the plurality of applications has a plurality of input features;

quantizing each of the plurality of input features for the plurality of applications;

performing binning of each of the plurality of input features quantized so that each of the plurality of input features for each of the plurality of applications is assigned to a bin among a plurality of bins to provide a matrix of bin membership for each of the plurality of applications;

querying a machine learning (ML) model for generating a vector for each of the plurality of applications based on a corresponding matrix of bin membership, wherein each of the plurality of bins is associated with a corresponding vector, such that each of the plurality of applications is characterized by a plurality of vectors based on the matrix of bin membership;

evaluating, via the ML model and for an application of the plurality of applications, the generated vector against a corresponding target value and presence of disparity in outcome for one or more of the plurality of input features, wherein the evaluating includes:

generating one or more function parameters for the corresponding matrix of bin membership;

generating a coefficient vector based on the one or more function parameters;

generating the corresponding target value based on the matrix of bin membership and the generated coefficient vector;

calculating a predicted output for the input dataset in view of the corresponding target value; and calculating for the presence of disparity in outcome for at least one of the plurality of input features;

performing one or more training iterations of the evaluating, on the ML model and for remaining applications of the plurality of applications until an offset value for each bin that adjusts a regression target for input features grouped into a particular bin is determined;

identifying, by the ML model and based on performance of the one or more training iterations on the ML model, a target coefficient vector among a plurality of coefficient vectors generated for the plurality of applications that provides an optimized output while negating the presence of disparity in outcome;

storing one or more function parameters including the identified target coefficient vector, and updating the ML model with the target coefficient vector, wherein the stored one or more function parameters approximate an objective function of the ML model to limit search space for more efficient exploration with respect to unobserved points; and applying the updated ML model on a subsequent application, wherein the updated ML model applies the offset at a bin level to provide an output without disparate outcome for any input feature of the subsequent application.

* * * * *